United States Patent [19]
Poinsard et al.

[11] B 3,927,405
[45] Dec. 16, 1975

[54] SYSTEM FOR PROCESSING THE SIGNAL RECEIVED BY A SIDEWAYS LOOKING AIRBORNE RADAR SYSTEM

[75] Inventors: Henri Poinsard; Jean Lemoing, both of Paris, France

[73] Assignee: Thomson-CSF, Paris, France

[22] Filed: May 17, 1973

[21] Appl. No.: 361,443

[44] Published under the Trial Voluntary Protest Program on January 28, 1975 as document no. B 361,443.

[30] Foreign Application Priority Data
May 19, 1972 France .............................. 72.18033

[52] U.S. Cl. ........ 343/5 CM; 343/7 A; 343/17.2 R; 343/17.5
[51] Int. Cl.² ........................................... G01S 9/02
[58] Field of Search .......... 343/5 CM, 5 DP, 9, 7 A, 343/17.2 R, 17.5

[56] References Cited
UNITED STATES PATENTS
3,242,484  3/1966  Russell .............................. 343/5 CM
3,737,900  6/1973  Vehrs, Jr. ......................... 343/5 CM
3,768,096  10/1973  Dentino ........................... 343/5 CM

*Primary Examiner*—Maynard R. Wilbur
*Assistant Examiner*—G. E. Montone
*Attorney, Agent, or Firm*—Cushman, Darby & Cushman

[57] ABSTRACT

The present invention relates to a system for processing the signal received by a sideways looking airborne radar system. The received signals are compared with a sawtooth frequency modulated reference signal, the slope and the repetition period of which is a function of the velocity of the aircraft. The compared signals are passed through a digital integrator, the integration time of which is equal to the repetition period of the sawtooth. Control means, receiving the velocity of the aircraft controls the slope and the repetition period of the sawtooth and the integration time.

7 Claims, 12 Drawing Figures

SYSTEM FOR PROCESSING THE SIGNAL RECEIVED BY A SIDEWAYS LOOKING AIRBORNE RADAR SYSTEM

BACKGROUND OF THE INVENTION

The present invention relates to systems for processing a signal received by a sideways looking airborne radar system. It relates more particularly to pulse-radar equipment.

This kind of radar, whose antenna is normally disposed perpendicularly to the axis of displacement of the aircraft, transmits and receives radar signals in such a fashion as to laterally scan the ground from the aircraft. It scans a band of terrain the dimensions of which depend, amongst other things, upon the characteristics of the radar beam. The radar emits an electromagnetic wave in the form of pulses. This wave is reflected by all the obstacles which are located within the radar beam, on the terrain below. The echoes are received by the radar after a delay which depends upon the distance between the aircraft and the obstacle. The band of terrain is consequently defined by maximum and minimum ranges of vision, taking into account the characteristics of the radar system. It is also defined by its width which depends upon the apertual angle of the radar beam. To achieve very fine scanning, it is necessary to utilise a radiator device which has extremely high directivity in the azimuthal plane, which necessitates substantial bulk and weight, factors which are incompatible with its application to an aircraft on board system.

Therefore, an antenna of reduced size is employed, the apertual angle of whose beam is consequently wide. Electronic devices which form part of the means used to process the signal after reception, make it possible by the utilisation of the Doppler effect, to effectively fine down the radar beam in the azimuthal sense. The system operates as if it had an antenna with better azimuthal directivity.

In systems of this kind, when a ground target located laterally with respect to the aircraft, enters the radar antenna beam, the target is detected, on reception, by a Doppler signal corresponding to the variations in the distance between the aircraft and the target. When the target is located exactly in a plane perpendicular to the trajectory of the aircraft and passing through the latter, the received signal is characterised by a zero Doppler frequency.

The present invention is concerned with the part of the system used to process the signal after reception. This processing in particular involves azimuthal and range processing.

In the known systems of this kind, the received signal, intermediate frequency, is compared with a reference signal in an amplitude-phase detector. The reference signal is supplied by a swept frequency local oscillator, the timing of the sweep corresponding to the center of the target region. The radar echoes are translated in frequency and the detected video signal is then processed by low-pass filtering. The filter means furthermore comprise a number N of low-pass filters or digital filters corresponding to N range channels.

When the region to be observed on the ground is large, only one local oscillator is insufficent, because the local oscillator sweep depends on the distance of each target. The frequency sweep depends also of the velocity of the aircraft and it becomes increasingly difficult to achieve a system which can process a large number of echoes of targets at various distances, this system being born by an aircraft, the velocity of which is variable.

SUMMARY OF THE INVENTION

An object of the present invention is to provide a system which makes it possible, during a finite time interval to spread the signal with the zero, or at any rate very low Doppler frequency, and which is essentially digital in nature (certain circuits remaining analogue in design however), the system resolving the difficulties described hereinbefore. It is used in combination with a device for measuring the velocity of the aircraft and comprises generating means for providing a reference signal which is sawtooth frequency modulated, amplitude-phase detecting means receiving the intermediate frequency output signal of the radar system on the one hand, and said reference signal on the other hand, integrating filtering means connected to the output of said detecting means, and control means connected to said velocity measuring device and coupled to said generating means and said integrating filtering means.

Other features of the present invention will become apparent from the ensuing description, given by way of example.

BRIEF DESCRIPTION OF THE DRAWINGS

FIG. 5 is a graph which plots as a function of time the amplitude of the signal obtained following a series of integrations over a time interval To;

FIG. 6 is an example of a frequency modulator circuit,

The elements reappearing in several figures, are in each case indicated by the same reference numbers.

DESCRIPTION OF THE INVENTION

Figure 1:
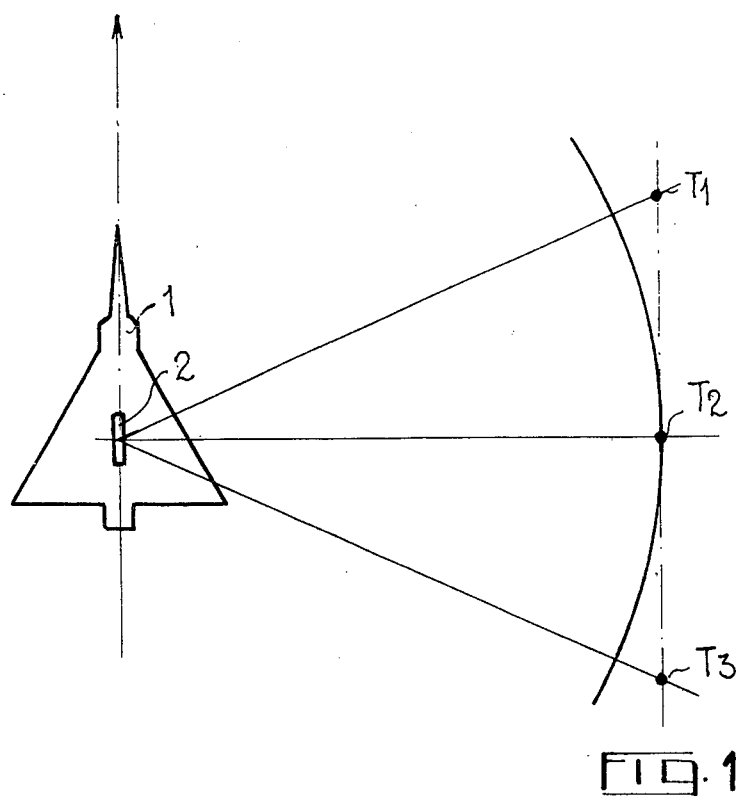
FIG. 1 shows an aircraft comprising a radar system with a side-looking antenna.
Figure 2:
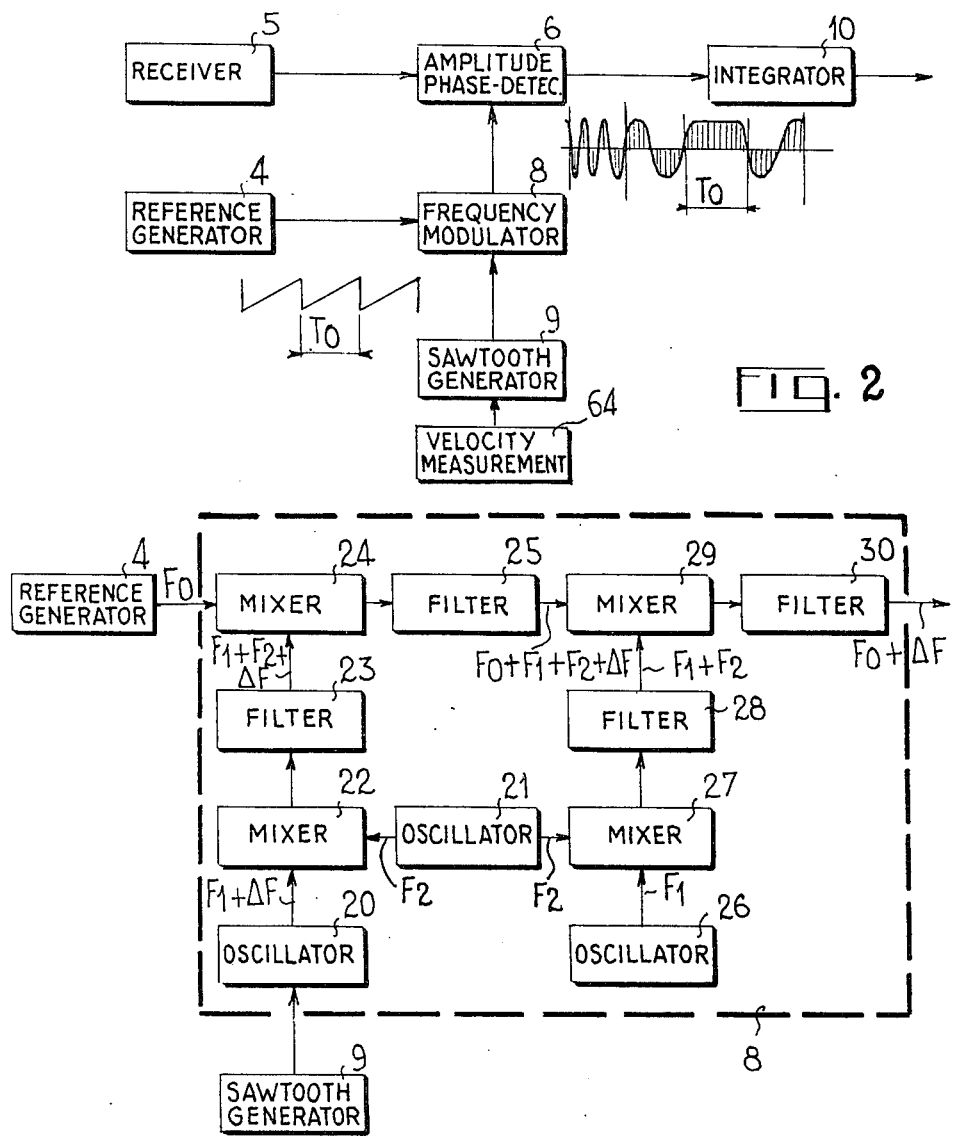
FIG. 2 is a simplified diagram of a processing system in accordance with the invention.

FIGS. 1 and 2 provide a reminder of the mode of operation of a radar with a sidelooking antenna, utilising the Doppler effect in order to fine down the beam in the direction of longitudinal displacement.

Figure 4:
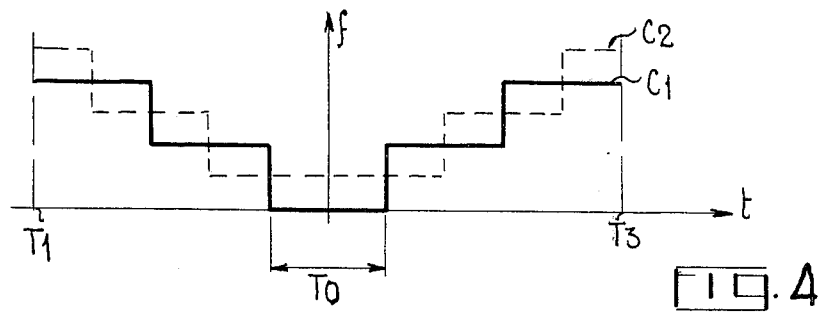
FIG. 4 is a graph illustrating the variation of the frequency of the output signal from the amplitude-phase detector, as a function of time.

FIG. 1 illustrates an aircraft with a radar system 2 equipped with a sidelooking antenna. The aircraft 1 is flying in a given direction. A target 3 located at a certain distance from the flightpath of the aircraft, will be located within the radar beam between the times T1 and T3. From the instant T1 onwards and up to the instant T2 where the target 3 is located upon the axis of the radar 2, the range separating the radar from the target decreases. Then, between the instant T2 and the instant T3, this range increases. On reception, therefore, the target is therefore detected by a piece of Doppler data due to the relative displacement between target and aircraft. The frequency time history for said target is shown in FIG. 4, curve A.

Where a certain number of obstacles are located within the radar beam, an identical number of echoes will be received after the transmission of a pulse. The first echo received corresponds to the nearest obstacle; the echoes received thereafter correspond to obstacles which are progressively further and further away. The range between two obstacles which are located in one and the same direction perpendicular to the aircraft flight path, is translated by the time interval separating the reception of the two echoes corresponding to the two obstacles. In order to be able to discern the presence of several obstacles during one and the same recurrence, the time interval separating the reception of the echo from an obstacle located at the minimum radar range it is desired to employ, from the reception of the echo produced by an obstacle located at the maximum radar range, is divided into a number N of parts. Each part of this time interval corresponds to part of the corresponding range interval. The video signal coming from the amplitude-phase detector is chopped and distributed to N different processing circuits. Each processing circuit corresponds to a range channel. The maximum number of different obstacles which can be detected during one recurrence is consequently equal to the number N of range channels.

FIG. 2 illustrates a simplified diagram of a processing system in accordance with the invention. Generating means comprise a reference frequency generator 4, a sawtooth generator 9 with a periodicity To and frequency modulator circuit 8 having two inputs respectively coupled to said generators 4 and 9. The signal at intermediate frequency coming from the receptor of the radar, is applied to a first input of a phase-amplitude detector 6, the second input of which is connected to the output of said frequency modulator. The signal from the detector 6 is then processed in an integrator 10 with N range channels. The control means represented by a velocity measuring device 64 are, here, connected to a control input of the sawtooth generator and control the slope and the repetition rate of said sawtooth. The video signal produced by the detector, in the presence of echoes belonging to a point target, is a succession of pulses the envelope of which is shown in annexe to FIG. 2.

Figure 3:
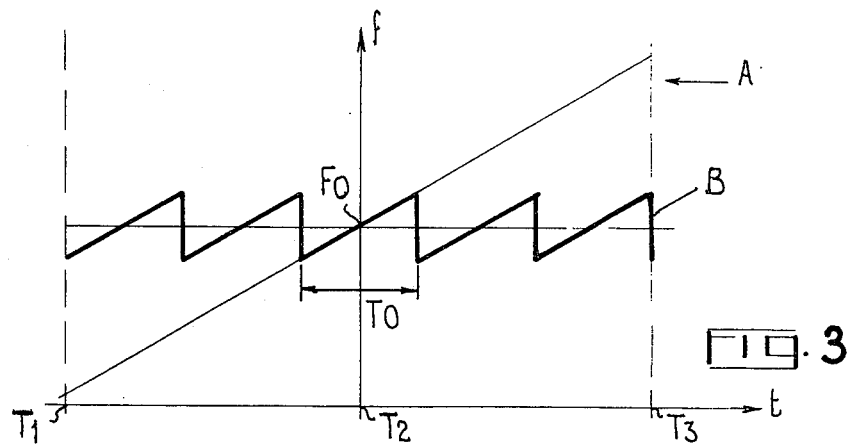
FIG. 3 is a graph showing the value of the Doppler frequency as a function of time, for signals coming from the receiver (A) and the frequency modulator (B)

FIG. 3 provides a graph illustrating the value of the Doppler frequency as a function of time, for a signal A coming from the receiver 5 (FIG. 2) and relating to a target, and for the signal B coming from the frequency modulator 8 (FIG. 2), between the instants T1 and T3. The signal A produced by the receiver is a signal whose frequency varies linearly and has a constant slope at either side of an intermediate frequency Fo. The frequency modulator produces a signal B containing a sawtooth frequency modulation of recurrrence periodicity To and slope identical to that of the signal A. A and B are then introduced into the amplitude-phase detector.

FIG. 4 illustrates a graph showing the variation of the frequency of the signal C1 (or C2) at the output of the amplitude-phase detector, as a function of time. It is constituted by a succession of steps of duration To, within which the frequency of the signal is constant.

Figure 5:
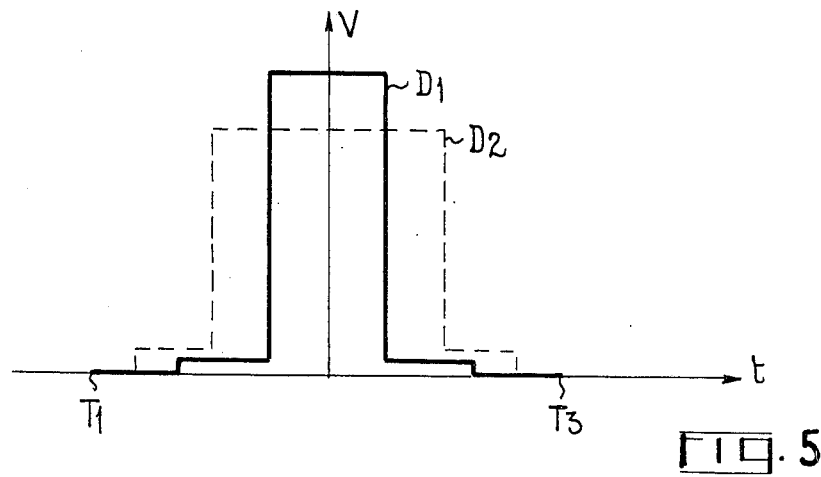

FIG. 5 provides a graph which plots as a function of time, the amplitude of the signal D1 (or D2), obtained following a succession of integration over a time interval To. In the most favourable case, where one of the steps in C1 (FIG. 4) is of zero frequency, the result of integration acquires a maximum amplitude (signal D1; for the other steps, which have frequencies other than zero, the result of integration has a very low or zero amplitude. In the most unfavourable case, where two steps at the centre have a frequency which is not quite zero (C2), (FIG. 4), after integration, the signal D2 will have a lower amplitude than the signal D1 albeit still a substantial one. At either side, the amplitude is likewise very low or zero. The value of the integration time To and of the recurrence frequency of the sawtooth signal, is determined in order to optimise the final result. Calculation shows that the optimum value of To depends upon the velocity $v$ of the aircraft, the wavelength $\lambda$ of operation of the radar and the distance $d$ between the target and the radar $$To = \sqrt{\lambda\, d/2v^2}$$

Under these conditions, in the most favourable case, where one of the steps of C1 is at zero frequency, the result D1 of the integration will be a maximum for this signal and zero for all others having frequencies other than zero. And in the most unfavourable case, namely that of two steps at the centre, each having a low frequency (C2), the ratio between the amplitude of the signals D2 and D1 will theoretically be $2/\pi$.

The repetition period To and the slope $df/dt$ of the sawtooth are computed for each range channel from the velocity of the aircraft by the control means. To is also the integration time and is used for controlling the integrating means 10.

FIG. 6 illustrates an embodiment of a frequency modulator circuit 8 (as shown in FIG. 2). It is controlled by the sawtooth generator 9 whose periodicity is To. The sawtooth signal from the generator 9 is injected at a control input of an oscillator 20 of controlled frequency. This oscillator will be a crystal oscillator for example, with linear frequency control. The oscillator produces a signal whose frequency follows a sawtooth variation $F1 + \Delta F$. Here, F1 is a frequency of the oscillator in the absence of any applied control, and $\Delta F$ the frequency variation. A second oscillator 21 produces a signal of frequency F2. These two signals are applied to a mixer 22 which is followed by a filter 23, the latter producing a signal of frequency $F1 + F2 + \Delta F$. This latter signal, and that of frequency Fo coming from the reference generator 4, are applied to a mixer 24 followed by a filter 25 which produces a signal of frequency $Fo+F1+F2+ \Delta F$. A third oscillator 26 produces a signal of frequency F1. The oscillators 26 and 20 are identical the control input of the oscillator 26 receive a constant zero signal. The two oscillators are installed in the same thermostatically controlled enclosure. The signals coming from the oscillators 21 and 26 are applied to a mixer 27 followed by a filter 28 which produces a signal of frequency $F1 + F2$. Finally, the signals of frequency $Fo + F1 + F2 + \Delta F$ and $F1 + F2$ are applied to a mixer 29 followed by a filter 30 which reconstitutes a signal of frequency $Fo + \Delta F$. The signal coming from the frequency modulator, therefore, incorporates a sawtooth frequency modulation of periodicity To and mean frequency Fo, and is represented by the signal B in FIG. 3.

In respect of an obstacle located at the minimum radar range, the signal A coming from the receiver 5 between the times T1 and T3, experiences a linear frequency variation of specific slope. In respect of an obstacle located at a range greater than the minimum radar range, this slope is the lower the further the obstacle is away. In other words, the rate of variation of the range of an obstacle from the radar, during transit by the radar beam, that is to say between the instants T1 and T3, is the lower the further away the obstacle is from the radar, and consequently the lower is the rate of variation of the frequency of the received signal. The same variation of frequency $\Delta F$, will be obtained for a longer transit time. The frequency modulator must therefore produce a signal B which is frequency-modulated in sawtooth fashion and which should have a slope equal to that of the signal A. This is achieved by modifying the sawtooth recurrence periodicity To and the slope $df/dt$. For a number N of range channels, an identical number of values To would be needed. For a given range and wavelength the slope $df/dt$ depends on the velocity of the aircraft. In reality, To varies as the square root of the radar range and consequently a smaller number of discrete values of To will generally suffice to cover the band of radar ranges involved.

Figure 7:
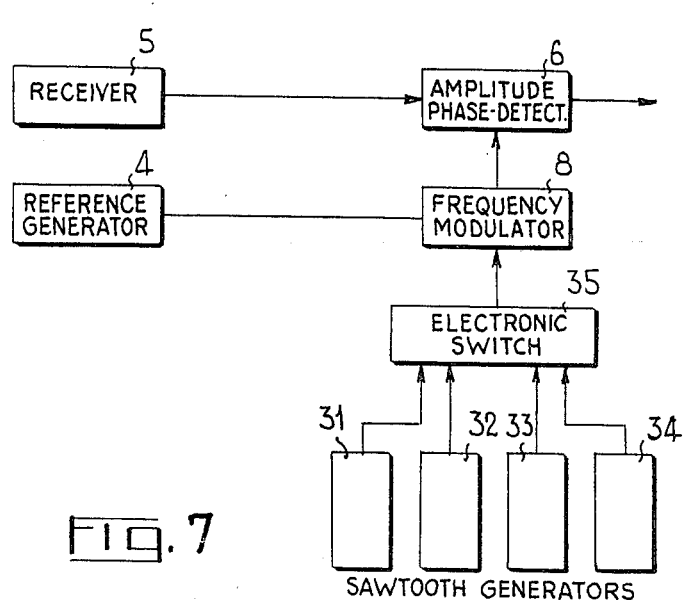
FIG. 7 is a partial diagram of the processing system, showing the frequency modulator section.

FIG. 7 is a partial diagram of the processing system, showing the frequency modulator section. The modulator 8 is controlled, for example, by four sawtooth generators 31, 32, 33, 34 with respective slopes and periodicities TO1, TO2, TO3, TO4. An electronic switch 35 successively connects the sawtooth generators in the modulator 8, during the radar recurrence period.

Figure 8:
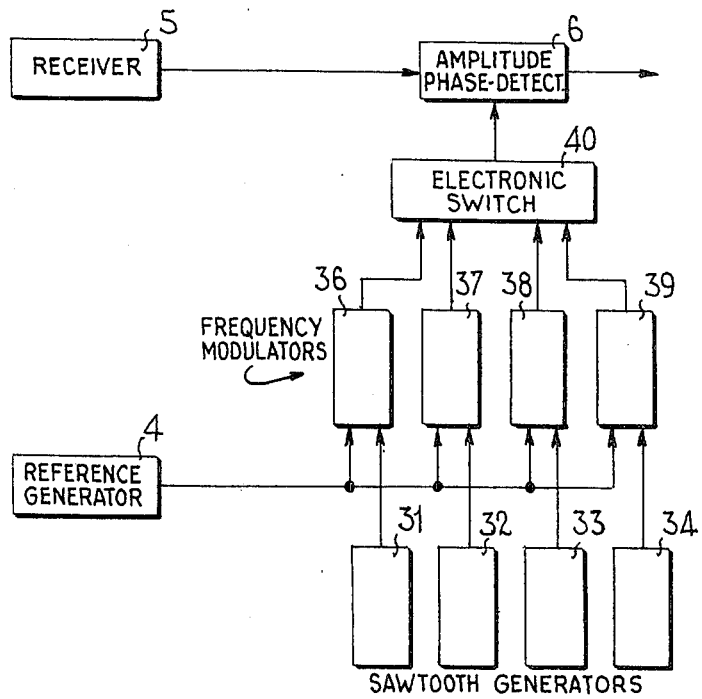
FIG. 8 is a variant embodiment of the preceding system.

FIG. 8 illustrates a variant embodiment of the foregoing system. The same number of sawtooth generators 31, 32, 33, 34 is used to respectively control the modulators 36, 37, 38, 39. The signal from the reference generator is applied simultaneously to the four modulators. Switching to the different outputs of the modulators is performed by means of an electronic switch 40.

Each sawtooth generator is constituted, for example, by a capacity charged by a controllable direct current generator. A switch connected between the terminals of said capacity discharges the capacity at the end of each period To. The control signal of the direct current generator and the pulses which control the switch are supplied by control means shown in FIG. 10 and 12.

Figure 9:
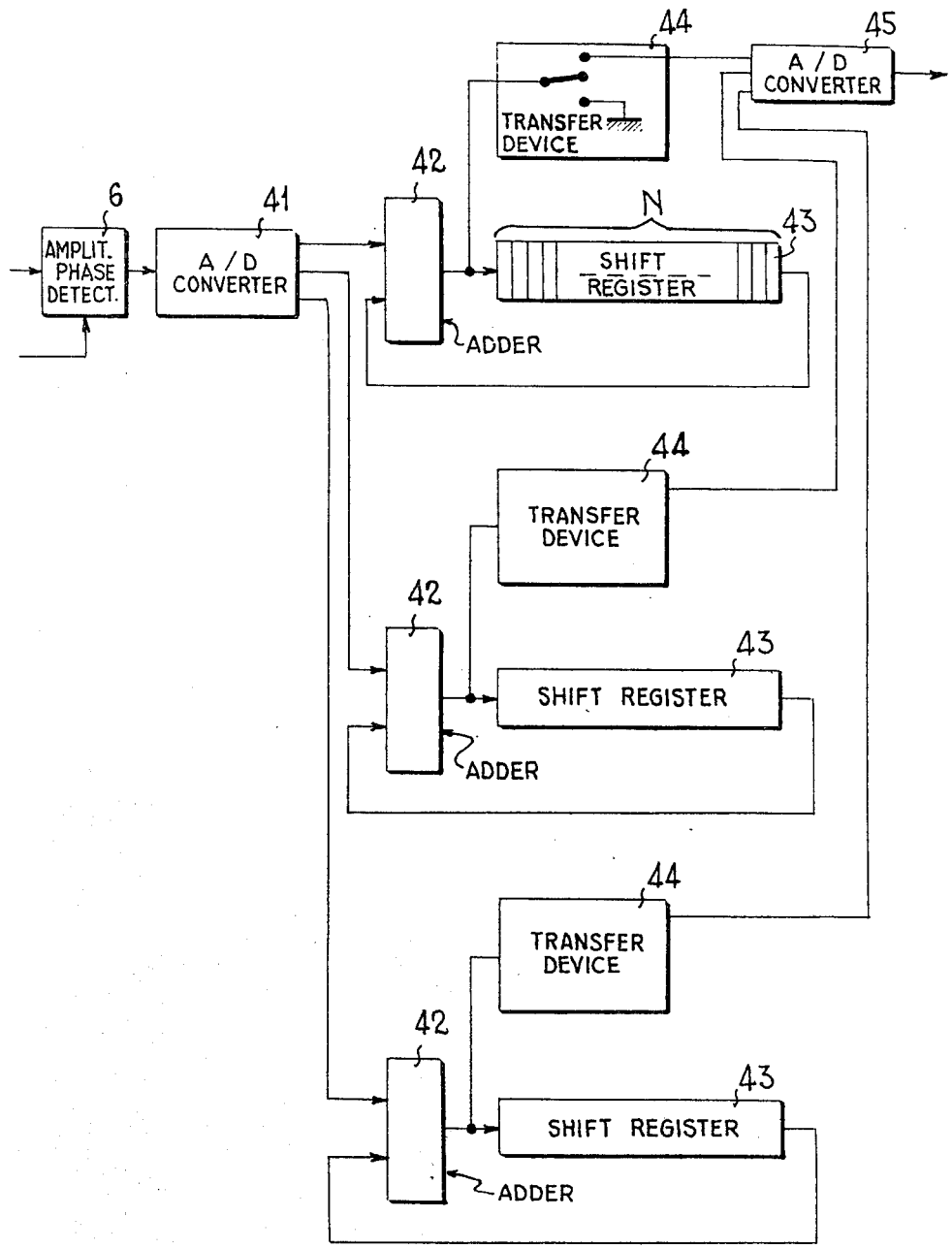
FIG. 9 is an embodiment of a digital integrator.

FIG. 9 illustrates an embodiment of a digital integrater. It successively comprises an analogue-digital converter 41, a digital adder 42, a shift register 43 with N stages, or in other words one stage per range channel, a transfer device 44 and a digital-analogue converter 45. In this figure, to simplify matters, a processing channel for three bits has been illustrated and the identical processing circuits for each bit have been indicated by the same reference. In reality, if the analogue-digital converter produces a binary signal, for example with 10 bits, it is followed by a ten-bit adder, then by ten shift registers, ten transfer devices and a ten-bit digital-analogue converter. Not to over-burden the following Figures, only one channel for one bit will be listed. The digital integration derives from the analogue integration function, for which purpose a delay line is used. In the case of digital integration, all the range channels are processed separately in a single digital integrator. The signals coming from one and the same target are supplied by the amplitude-phase detector 6 in the rhythm of the radar recurrence frequency.

Considering an echo signal produced from a target by a pulse, the output signal of the amplitude-phase detector is coded in the converter 41 and then fed into the shift register 43 after passing through the adder 42 which also receives the output signal from the register. Control pulses shift the data through the shift register so that the time of transit there is equal to the recurrence periodicity of the radar. At the instant at which an integration period To begins, we will assume that all the stages of the shift register 43 are empty, the data pertaining to the first range channel being stored in the first stage. Then, a first control pulse shifts the data in a stage, towards the output. The first stage, then empty, receives the data pertaining to the second range channel. A second shift pulse again shifts the data through the register. The process is then repeated until the $N^{th}$ range channel is reached. After the arrival of the data pertaining to the last range channel, the data pertaining to the first, second etc. . . and the last range channels, are then respectively stored in the last, penultimate, etc. . . and first stages of the first register. After the emission of the pulse corresponding to the next recurrence, a control pulse shifts all the data by one stage through the register. The content of the last stage is then supplied to the adder 42 where it is added to the new data pertaining to the first range channel and the result is stored subsequently in the first stage, then empty, of the register 43. With the next recurrence, and, generally speaking, with all the other recurrences within one and the same period To and for each range channel, the data pertaining to one range channel is added to the sum of the data pertaining to said same channel and corresponding to the preceding recurrences. When the time To has elapsed, a last piece of data relating to a range channel and corresponding to the last recurrence, is added to the sum of the preceding pieces of data for said channel, and the result is then rooted towards the digital-analogue converter 45 through the medium of the transfer device 44. This same device then controls the resetting of the stage corresponding to this range channel, in the shift register. The process of integration starts again for a new period To. The converter 45 produces the video signal processed by the fining down system. The transfer device is controlled, during the flyback portion of the sawtooth waveform of periodicity To, in accordance with the corresponding stage of the shift register. A first command shifts the data from the output of the adder 42 and the converter 45. A second command, immediately following the first, controls the cancellation of the content of the first stage of the shift register 43.

In the case shown in FIGS. 7 and 8, where four different integration periods are utilised, the data pertaining to a first part of the N range channels are integrated over a period of TO1 for example, those pertaining to a second part of the N channels integrated over a period of TO2, those pertaining to a third part of the N channels, over a period TO3 and the rest over a period TO4. At the end of each integration period TO1 for example, only the data pertaining to the first part of the N range channels are successively picked off by the transfer device 44. The same happens with each group of range channels, independently of one another.

Figure 10:
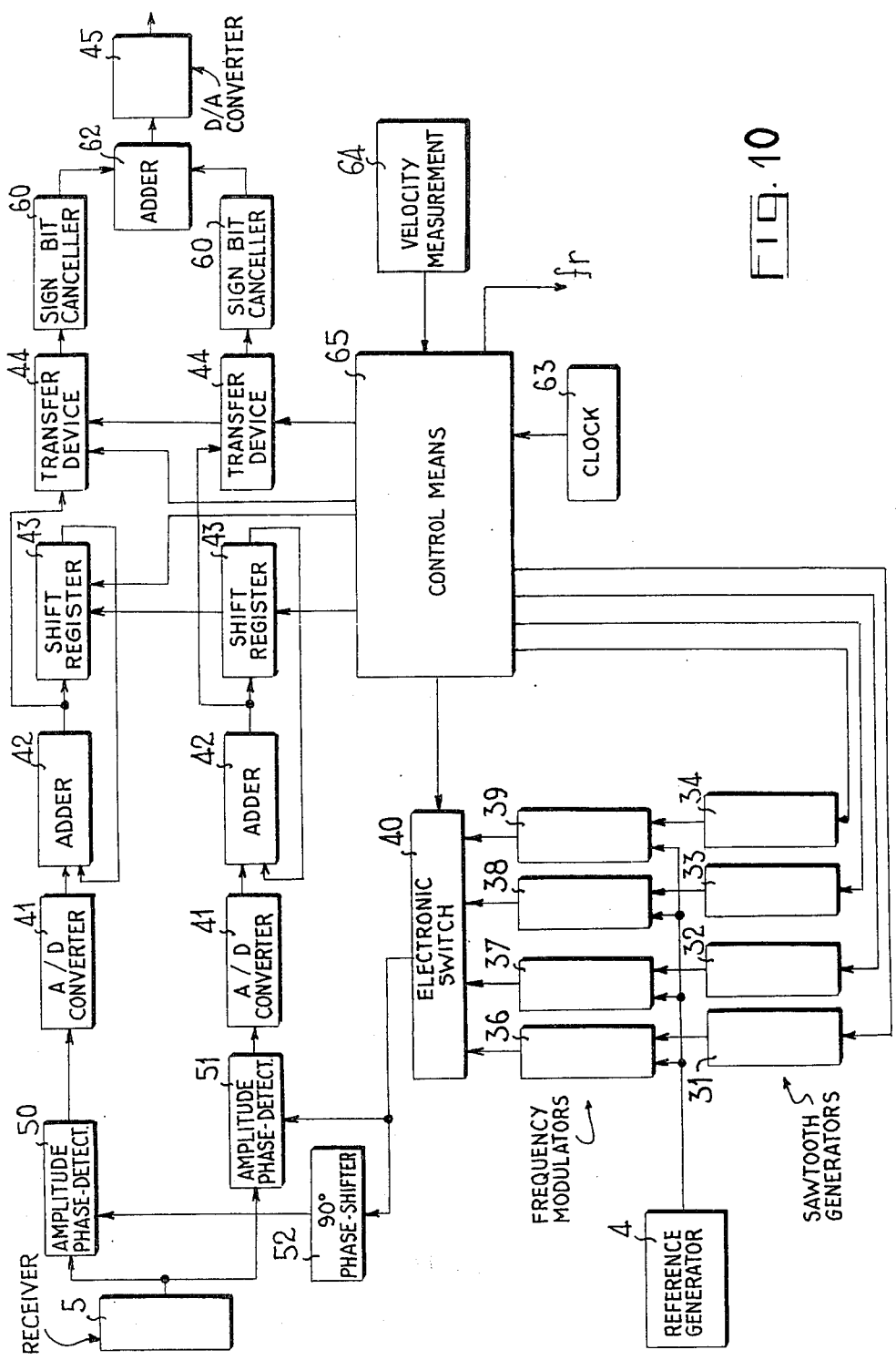
FIG. 10 is the complete diagram of an embodiment of a processing system in accordance with the invention.

FIG. 10 illustrates the complete circuits diagram of an embodiment of a processing system in accordance with the invention. The system comprises the assembly of the embodiments illustrated by FIGS. 8 and 9. It comprises a receiver 5 followed by two amplitude-phase detectors 50 and 51, fed in quadrature, and two identical integrating circuits combined in order to overcome parasitic phase-shift. This two channels processing is known as "vector canceller." Frequency modulator circuits 36, 37, 38, 39, receive on the one hand the signal produced by the reference generator 4 and on the other hand the signals coming respectively from sawtooth generators 31, 32, 33, 34. A switch 40 chooses, as a function of time and during one and the same recurrence, a specific signal and this signal is applied on the one hand to the amplitude-phase detector 50 and on the other to the detector 51 after a phase-shift of 90° in the phaseshift element 52. Each detector is followed by an identical integrating circuit namely an analogue-digital converter 41, a digital integrator comprising an adder 42, a shift register 43 and a transfer circuit 44, and a sign bit cancelling circuit 60. In the figure, the elements of each integrating circuit have been indicated by the same reference.

The signals coming from the two integrating circuits are added in a digital adder 62 and the result is converted into analogue form by means of the digital-analogue converter 45 which produces the processed video signal.

Figure 12:
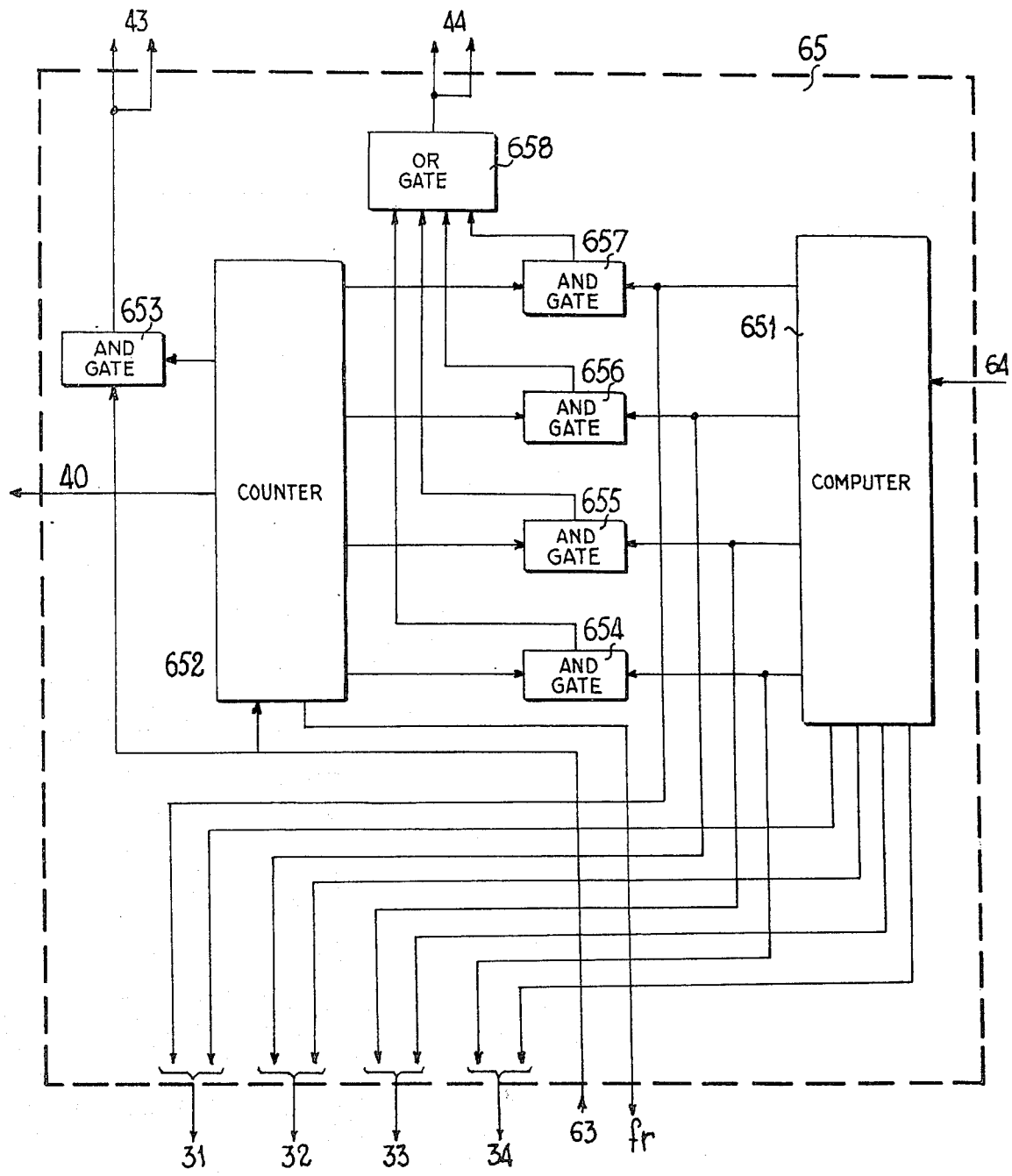
FIG. 12 is an embodiment of the control means.

Control, monitoring and synchronisation of the assembly is effected by a control element 65. This element furnishes the signals required for the operation of the sawtooth generators, the switch 40, the shift registers 43 and the transfer devices 44. It is supplied moreover with the aircraft velocity data supplied by the measuring means 64 as well as with the clock pulses from a clock 63 having a high recurrence frequency. The control element 65 governs the radar system and monitors its proper operation, and is shown in FIG. 12.

It is constituted by digital circuits 652 for forward and/or backward counting of the pulses produced by the clock 63, and a computer 651 receiving the velocity of the aircraft and computing the period TO1, TO2, TO3, TO4 and the slope of the sawtooths.

The computer comprises known multiplicating and dividing circuits for computing $TO_i = \sqrt{\lambda\, di/2v^2}$ where $i = 1, 2, 3, 4$ and $(df/dt)_i = 2v^2/\lambda di$. The distances $d1, d2, d3, d4$ and the wavelength $\lambda$ are programmed in the computer or can be introduced by an operator. Four outputs of the computer furnish the period TO1, TO2, TO3 and TO4 uses by both the saw-tooth generators and the integrators. One of these output signals is shown FIG. 11 at L. It is constituted by a series of pulses of recurrence period TO2 and of duration which is a little greater than the repetition period of the radar pulses $1/fr$. Four other outputs furnish the slopes $(df/dt)_i$ used only by the sawtooth generators. The outputs of the computer are directly connected to the control input of the sawtooth generators. The end of the sawtooth corresponds to the flyback portions of the pulses of period $TO_i$.

Figure 11:
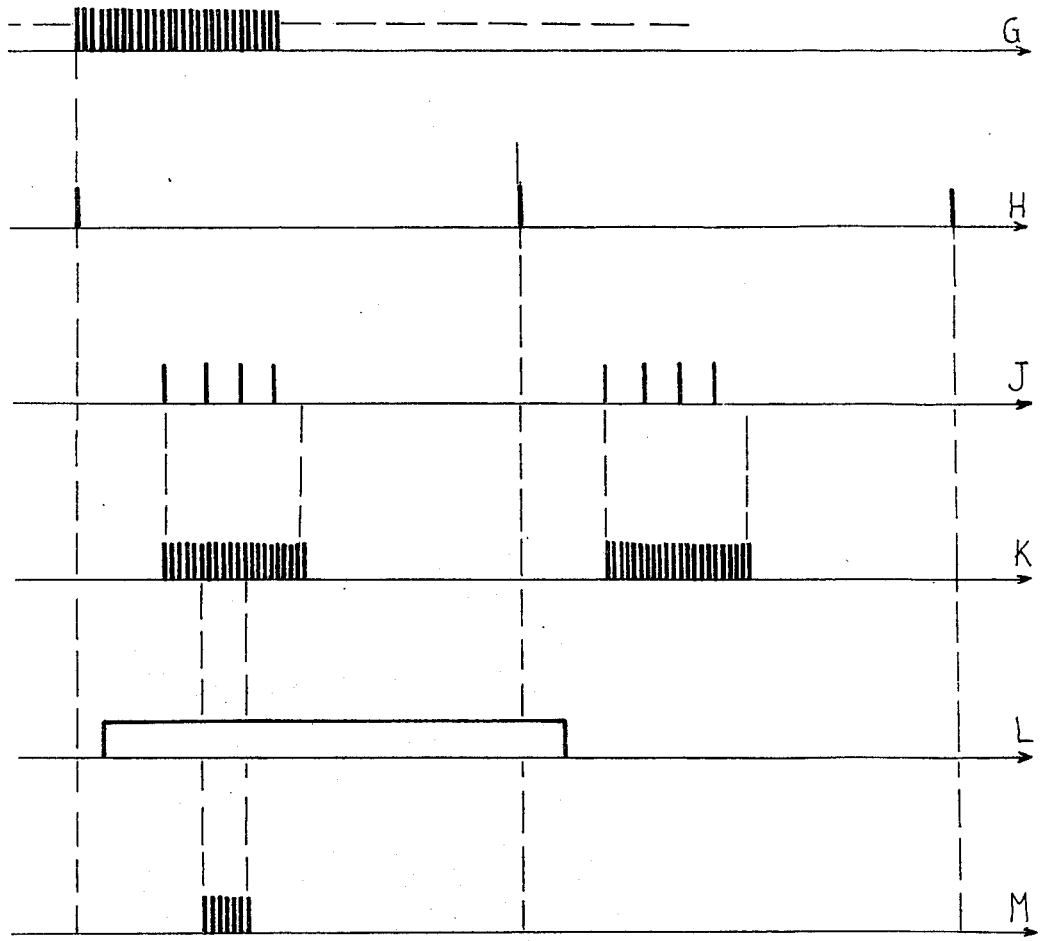
FIG. 11 is an example of the shape of the various control signals applied to the processing system.

The counter 652 produces pulses at the radar recurrence frequency fr for the radar transmitter circuits. FIG. 11 shows at G the clock pulses and at H the pulses at radar recurrence frequency which coincide with the emitted pulses. The counter also provides control pulses for the switch 40 (represented at J, FIG. 11), control pulses for the shift registers, and four series of control pulses for the transfer circuits. FIG. 11 shows at K the control pulses for the shift registers 43. They are obtained at the output of an AND gate 653 receiving the clock pulses on a first input and a large pulse from the counter on a second input. The beginning and the end of the large pulse correspond respectively to the nearest and the farthest target data the system is able to process.

The series of control pulses for the shift register are divided in four series of control pulses for the transfer circuits 44. FIG. 11 shows at M the second series of these pulses. These four series are applied to a first input of four AND gates 654, 655, 656 and 657, the second input of which are connected to the outputs of the computer 651 which controls the integration times TO1, TO2, TO3 and TO4. For example, at the end of the integration time TO2, the computer provides a large pulse, shown at L and authorizes the AND gate 655 to transmit the series of pulses shown at M. The operations are the same for the AND gates 654, 656, 657. The outputs of the four AND gates are connected to four inputs of an OR gate 658, the output of which is connected to the control inputs of the transfer circuits.

The processing system forming the subject of the present invention is designed more particularly for utilisation in airborne radar equipment with side-looking antennas, and in particular in cartographic radars.

What is claimed is:

1. A system for processing the signals received by a sideways looking airborne pulse radar system, used in combination with a device for measuring the velocity of the aircraft comprising:

first generating means for providing a reference signal;

second generating means for providing a plurality of sawtooth signals each sawtooth signal having a repetition period and a slope dependent on both the velocity of the aircraft and the distance of a determined target region;

a plurality of modulating means for modulating said reference signal respectively with said sawtooth signals, thereby providing sawtooth frequency modulated signals;

distance gating means for successively selecting portions of said sawtooth frequency modulated signals at predetermined instants of each repetition period of the radar pulses;

comparing means for comparing said received signals with the output signal of said distance gating means, providing output signals in response to said comparison;

range-gated integrating filtering means for integrating each output signal of the comparing means during a period equal to the repetition period of the corresponding sawtooth signal used for providing said output signal and control means, fed by said velocity measuring device and coupled to said second generating means, for controlling the periods and slopes of said sawtooth signals and to said integrating means for controlling their integration time.

2. The combination of claim 1, wherein said integrating filtering means comprise a digital integrator having a plurality of distance channels and a data transfer device for delivering integrated signal at the end of each integration period, said integrating filtering means having a plurality of integration times equal to the recurrence period of said sawtooth signals.

3. Integrating filtering means as claimed in claim 2, wherein said digital integrator comprise a shift register.

4. The combination of claim 2, wherein said control means comprise:

computing means receiving the output signal of said velocity measuring device, for computing and controlling said slope and repetition period of said sawtooth signals, clock means supplying pulses at a determined repetition rate, and counting circuits connected to said computing means and said clock means for supplying control signals to said distance gating means and said integrating filtering means.

5. The combination of claim 4, wherein said counting circuits also provide synchro pulses for said radar system.

6. The combination of claim 1, wherein each modulating means comprise:

an input for receiving said reference signal;

an output for delivering a sawtooth frequency modulated signal;

a first and a second mixers, each followed by a filter, and connected in series between said input and said output, a third and a fourth mixers, each followed by a filter, coupled respectively to said first and second mixers;

a first local oscillator connected both to said third and fourth mixers;

a second and a third local oscillators connected respectively to said third and fourth mixers, said oscillators being identical with one another and have their frequencies linearly controllable, being arranged in one and the same statically controlled enclosure and one of them operating at a fixed frequency whilst the other is supplied at its input control with a sawtooth signal.

7. A system for processing the signals received by a sideways looking airborne pulse radar system, used in combination with a device for measuring the velocity of the aircraft comprising:

first generating means for providing a reference signal;

second generating means for providing a plurality of sawtooth signals, each sawtooth signal having a repetition period and a slope depending on both the velocity of the aircraft and the distance of a determined target region;

distance gating means for successively selecting portions of said sawtooth signals at determined instants of each repetition period of the radar pulses;

modulating means for modulating said reference signal with the output signal of said distance gating means thereby providing a sawtooth frequency modulated signal;

comparing means for comparing said received signals with said sawtooth frequency modulated signal, providing output signals in response to said comparison;

range-gated integrating filtering means for integrating each output signal of the comparing means during a period equal to the repetition period of the corresponding sawtooth signal used for providing said output signal; and control means fed by said velocity measuring device and coupled to said second generating means for controlling the periods and slopes of said sawtooth signals and to said integrating means for controlling their integration time.

* * * * *